United States Patent
Lin

(10) Patent No.: US 9,551,823 B2
(45) Date of Patent: Jan. 24, 2017

(54) BACKLIGHT MODULE

(71) Applicant: LEXTAR ELECTRONICS CORPORATION, Hsinchu (TW)

(72) Inventor: Ku-Cheng Lin, Taoyuan County (TW)

(73) Assignee: Lextar Electronics Corporation, Hsinchu (TW)

( * ) Notice: Subject to any disclaimer, the term of this patent is extended or adjusted under 35 U.S.C. 154(b) by 129 days.

(21) Appl. No.: 14/207,451

(22) Filed: Mar. 12, 2014

(65) Prior Publication Data

US 2015/0070931 A1    Mar. 12, 2015

(30) Foreign Application Priority Data

Sep. 6, 2013 (TW) .............................. 102132145 A

(51) Int. Cl.
  *F21V 7/04* (2006.01)
  *F21V 8/00* (2006.01)

(52) U.S. Cl.
  CPC ............. *G02B 6/0031* (2013.01); *G02B 6/009* (2013.01)

(58) Field of Classification Search
  CPC ................ G02B 6/0031; G02B 6/0073; G02F 1/133553; G02F 1/133605; G09F 2013/142; G09F 2013/049
  See application file for complete search history.

(56) References Cited

U.S. PATENT DOCUMENTS

| 7,445,368 B2* | 11/2008 | Huang et al. ................. 362/609 |
| 2003/0223218 A1* | 12/2003 | Kawakami ....................... 362/31 |
| 2007/0165419 A1* | 7/2007 | Horiuchi et al. ............. 362/606 |
| 2010/0007817 A1* | 1/2010 | Kim ................................. 349/60 |
| 2011/0261585 A1* | 10/2011 | Shibata et al. ................ 362/607 |
| 2012/0063163 A1 | 3/2012 | Lai |

FOREIGN PATENT DOCUMENTS

| CN | 102384401 | 3/2012 |
| TW | 201001019 | 1/2010 |

OTHER PUBLICATIONS

Taiwan Patent Office, Office Action, Patent Applicaition No. 102132145, Mar. 26, 2015, Taiwan.

* cited by examiner

*Primary Examiner* — Peggy Neils
*Assistant Examiner* — Alexander Garlen

(57) ABSTRACT

A backlight module is provided, including a circuit board, a plurality of light-emitting elements, a frame, and a plurality of first and second light-reflecting portions. The light-emitting elements are disposed on the circuit board and separated from each other. The frame includes a base plate and two lateral plates extended from the base plate, wherein the circuit board is disposed on the base plate. The first and second light-reflecting portions are disposed on at least one of the lateral plates and arranged in a staggered manner. The first light-reflecting portions are closer to the light-emitting elements than the second light-reflecting portions. The reflectivity of the second light-reflecting portions exceeds that of the first light-reflecting portions.

10 Claims, 4 Drawing Sheets

BACKLIGHT MODULE

CROSS REFERENCE TO RELATED APPLICATIONS

The present application claims priority of Taiwan Patent Application No. 102132145, filed on Sep. 6, 2013, the entirety of which is incorporated by reference herein.

BACKGROUND OF THE INVENTION

Field of the Invention

The present application relates to a backlight module, and in particular to a backlight module including two different reflecting portions.

Description of the Related Art

Referring to FIG. 1, a conventional edge-type backlight module 10 includes a circuit board 10a, multiple light-emitting elements 10b, and a light-guide plate 10c. The light-emitting elements 10b are disposed on the circuit board 10a and separated from each other. The circuit board 10a is disposed on a side of the light-guide plate 10c.

To facilitate a thin and light display, several conventional designs for the backlight module are provided. For example, a distance y between the light-emitting elements 10b and the light-guide plate 10c of the backlight module 10 may be reduced, and a distance x between the light-emitting elements 10b may be increased to reduce the quantity of the light-emitting elements 10b. However, this may lead the light-mixing space of the backlight module 10 being insufficient and causing a non-uniform light-emitting intensity. For example, the areas adjacent to the light-emitting elements 10b may form bright regions, and the areas between the light-emitting elements 10b may form dark regions.

BRIEF SUMMARY OF THE INVENTION

In view of the aforementioned problem, the invention provides a backlight module which can reduce the problem of non-uniform light-emitting intensity. The backlight module has features such as being thin and light without increasing the quantity of the light-emitting elements and increasing the distance between the light-emitting elements and the light-guide plate.

An embodiment of the invention provides a backlight module, including a circuit board, a plurality of light-emitting elements, a frame, and a plurality of first and second light-reflecting portions. The light-emitting elements are disposed on the circuit board and separated from each other. The frame includes a base plate and two lateral plates extended from the base plate, wherein the circuit board is disposed on the base plate. The first and second light-reflecting portions are disposed on at least one of the lateral plates and arranged in a staggered manner. The first light-reflecting portions are closer to the light-emitting elements than the second light-reflecting portions. The reflectivity of the second light-reflecting portions exceeds that of the first light-reflecting portions By applying the first and second light-reflecting portions to the backlight module of the invention, wherein the first and second light-reflecting portions respectively have the properties of light absorption and light reflection, the problem of non-uniform light-emitting intensity of the backlight module can be improved.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
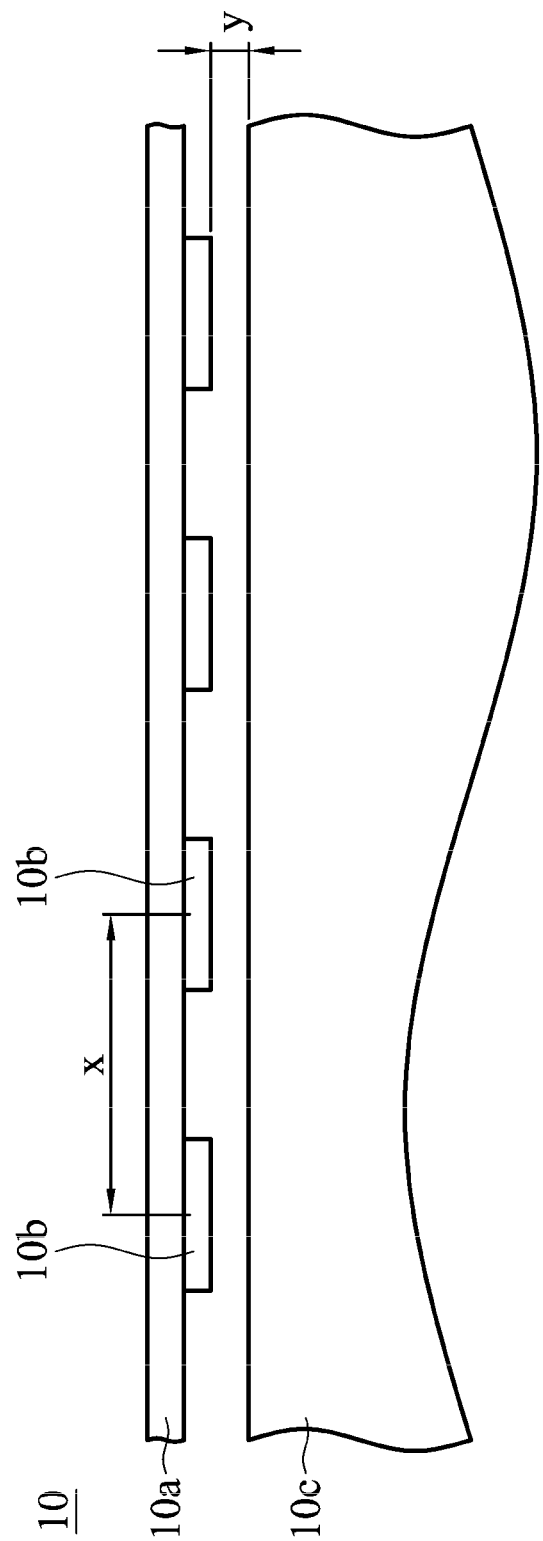
FIG. 1 is a schematic diagram of a conventional edge-type backlight module.
Figure 2A:
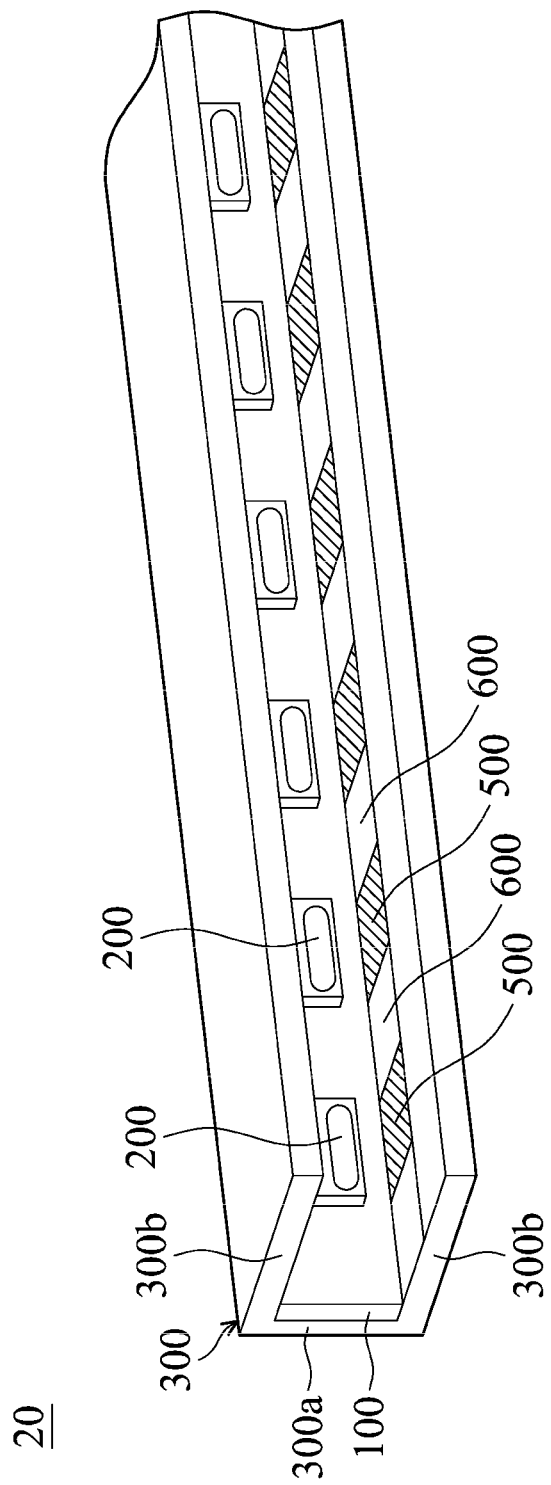
FIG. 2A is a schematic diagram of a backlight module (the light-guide plate is omitted) according to an embodiment of the invention.
Figure 2B:
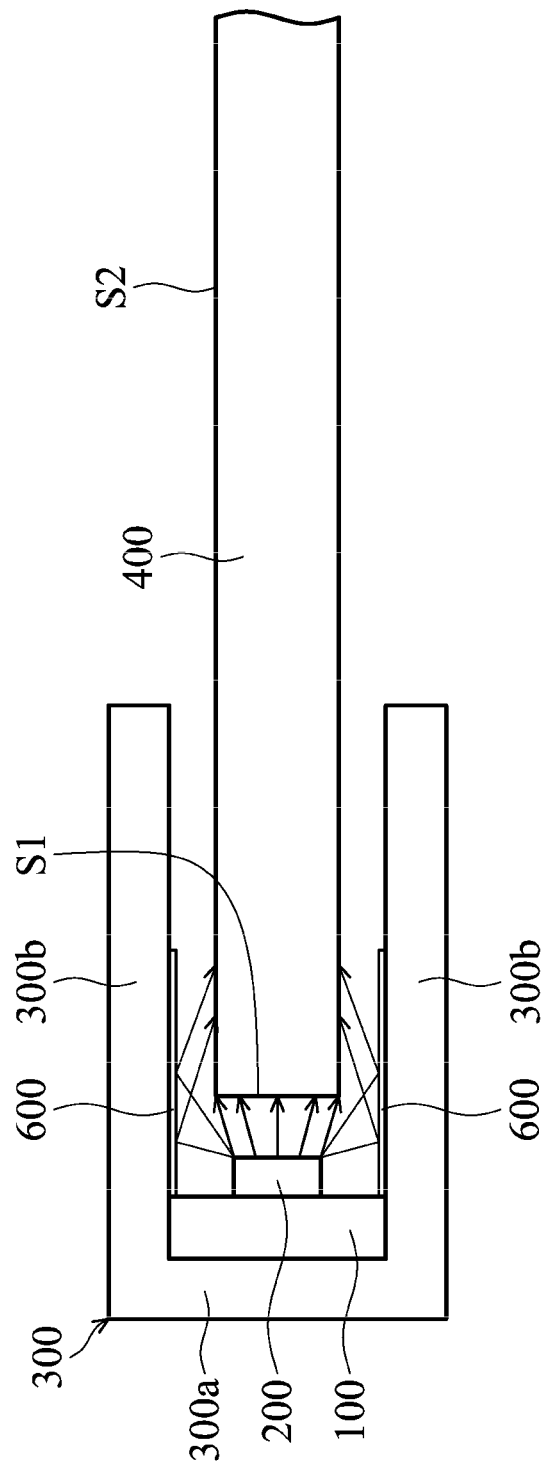
FIG. 2B is a schematic diagram of the backlight module in FIG. 2A and a light-guide plate.
Figure 3A:
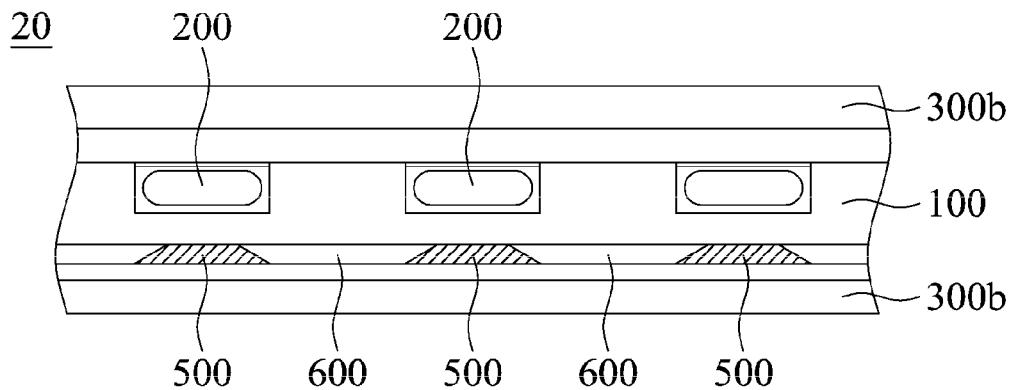
FIGS. 3A-3C schematically shows the shapes of the first light-reflecting portions according to different embodiments of the invention.
Figure 3B:
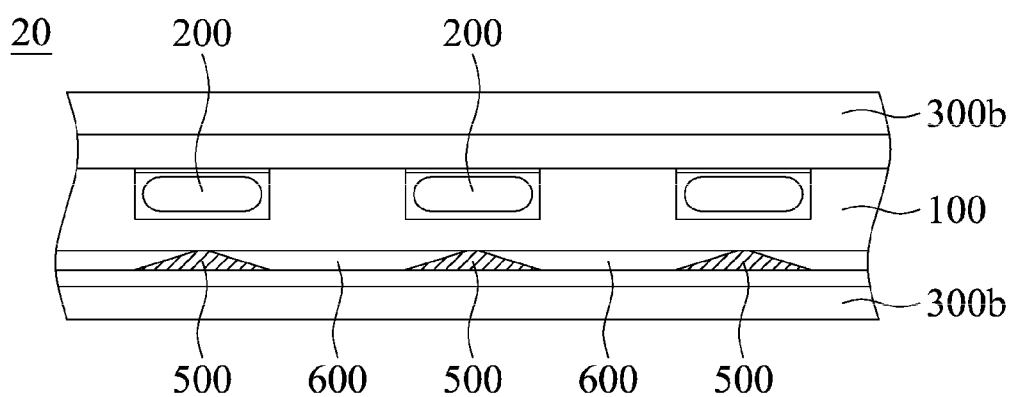
Figure 3C:
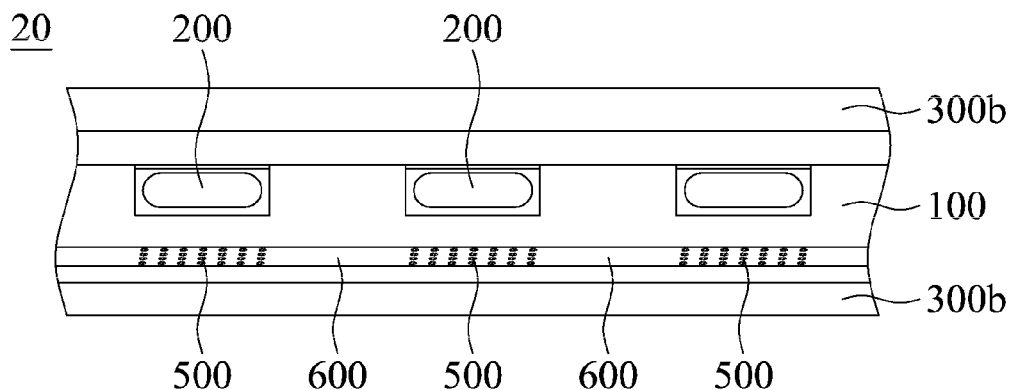

Referring to FIG. 2A and FIG. 2B, a backlight module 20 according to an embodiment of the invention, such as an edge-type backlight module, may be applied to a liquid-crystal display. The backlight module 20 includes a longitudinal circuit board 100, a plurality of light-emitting elements 200 disposed on the circuit board 100 and separated from each other, a frame 300, and a light-guide plate 400 (FIG. 2B).

In this embodiment, the light-emitting elements 200 are, for example, light-emitting diodes (LEDs). The frame 300 includes a base plate 300a and two lateral plates 300b vertically extended from the base plate 300a. As such, the base plate 300a and the two lateral plates 300b form a U-shaped structure. The circuit board 100 is disposed on the base plate 300a. As shown in FIG. 2B, a portion of the light-guide plate 400 is arranged in the frame 300. The light-guide plate 400 includes a light-incident surface S1 facing the light-emitting elements 200 and a light-emitting surface S2 perpendicular to the light-incident surface S1. The light from the light-emitting elements 200 enters the light-guide plate 400 from the light-incident surface S1, and then exits by the light-emitting surface S2.

Referring to FIG. 2A and FIG. 2B, the backlight module 20 further includes a plurality of first and second reflecting portions 500 and 600 disposed on at least one of the lateral plates 300b and arranged in a staggered manner. In this embodiment, the first and second reflecting portions 500 and 600 are disposed on both of the lateral plates 300b. The first reflecting portions 500 are closer to the light-emitting elements 200 than the second reflecting portions 600, wherein the reflectivity of the second reflecting portions 600 exceeds that of the first reflecting portions 500. Accordingly, the first reflecting portions 500 can absorb a part of the light emitted from the light-emitting elements 200, and the second reflecting portions 600 can be configured to enhance the light reflecting capability of the backlight module 20 (as shown in FIG. 2B), therefore achieving uniform light-emitting intensity.

In this embodiment, the first reflecting portions 500 have a dark-colored material, such as a black material, and the second reflecting portions 600 have a light-colored material, such as a white material. The first reflecting portions 500 and/or the second reflecting portions 600 may be coating, tape, reflective paint, or a sticker. Additionally, the shape of each first reflecting portion 500 corresponds to the shape of each second reflecting portion 600. As shown in FIGS. 2A, and 3A-3C, each of the first reflecting portions 500 may have a rectangular, trapezoidal, triangular, or circular patterns arranged in a matrix, corresponding to the light-emitting angle of each light-emitting element 200.

As mentioned above, the invention provides a backlight module, for example, an edge-type backlight module, can be applied to a liquid-crystal monitor. By applying two different reflecting portions to at least one of the lateral plates of the frame in a staggered manner, wherein the reflecting portions having lower reflectivity for absorbing light are adjacent to the light-emitting elements, and the reflecting portions having higher reflectivity for reflecting light are disposed between the light-emitting elements, the problem of non-uniform light-emitting intensity of the backlight module can be improved. Moreover, since it does not need to increase the quantity of the light-emitting elements and increase the distance between the light-emitting elements and the light-guide plate, the backlight module of the invention can also be suitable for use in a thin, light display.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a circuit board;
   a plurality of light-emitting elements, disposed on the circuit board and separated from each other;
   a frame, including a base plate and two lateral plates extended from the base plate, wherein the circuit board is disposed on the base plate;
   a plurality of first and second reflecting portions disposed on the two lateral plates and arranged in a staggered manner, wherein the first reflecting portions are closer to the light-emitting elements than the second reflecting portions, and the reflectivity of the second reflecting portions exceeds that of the first reflecting portions; and
   a light-guide plate disposed between the two lateral plates of the frame, and the light-guide plate includes a light-incident surface and a light-emitting surface perpendicular thereto, wherein the light from the light-emitting elements enters the light-guide plate from the light-incident surface and exits by the light-emitting surface, and the entirety of both the first reflecting portions and the second reflecting portions on both of the two lateral plates are respectively separated from the entirety of the light-guide plate by a gap.

2. The backlight module as claimed in claim 1, wherein the first reflecting portions have a dark-colored material, and the second reflecting portions have a light-colored material.

3. The backlight module as claimed in claim 1, wherein the first reflecting portions or second reflecting portions is coating, tape, reflective paint, or a sticker.

4. The backlight module as claimed in claim 1, wherein each first reflecting portion is arranged adjacent to a corresponding light-emitting element, and the shape of each first reflecting portion corresponds to a light-emitting angle of each corresponding light-emitting element, wherein a width of each first reflecting portion increases in a direction away from each corresponding light-emitting element.

5. The backlight module as claimed in claim 4, wherein each of the first reflecting portions has a trapezoidal or triangular shape.

6. The backlight module as claimed in claim 1, wherein the first reflecting portion has a plurality of circular patterns arranged in a matrix.

7. The backlight module as claimed in claim 1, wherein the shape of each first reflecting portion corresponds to the shape of each second reflecting portion.

8. The backlight module as claimed in claim 1, wherein the base plate and the lateral plates form a U-shaped structure.

9. The backlight module as claimed in claim 1, wherein the light-emitting elements are light-emitting diodes.

10. The backlight module as claimed in claim 1, wherein the first reflecting portions and second reflecting portions are coating, tape, reflective paint, or a sticker.

* * * * *